United States Patent [19]
Tuttle, deceased et al.

[11] 3,938,891
[45] Feb. 17, 1976

[54] APPARATUS FOR DETECTING CHANGES IN A NATURAL OCEAN WAVE PATTERN

[76] Inventors: Fordyce E. Tuttle, deceased, late of Palm Beach, Fla. by Eleanor Porter Tuttle, executrix, P.O. Box 908, Palm Beach, Fla. 33480

[22] Filed: Nov. 24, 1972

[21] Appl. No.: 310,187

Related U.S. Application Data

[63] Continuation of Ser. No. 54,293, July 13, 1970, abandoned.

[52] U.S. Cl. .................. 356/120; 356/114
[51] Int. Cl.² .................. G01B 11/30; G01N 21/40
[58] Field of Search ............ 356/33, 209, 120, 114, 356/118, 225, 5, 28; 350/17; 354/71

[56] References Cited
UNITED STATES PATENTS

| | | | |
|---|---|---|---|
| 3,242,836 | 3/1966 | Bartsch | 356/120 |
| 3,533,697 | 10/1970 | Hughes | 356/120 |
| 3,667,846 | 6/1972 | Nater et al. | 356/120 |

*Primary Examiner*—Alfred E. Smith
*Assistant Examiner*—Conrad J. Clark
*Attorney, Agent, or Firm*—Malin & Haley

[57] ABSTRACT

An apparatus and method for detecting deviations from a normal ocean wave pattern which may be caused by interference with artificially created wave patterns, such as from an underwater moving vehicle. A camera mounted in an aircraft has its optic axis vertically disposed and is provided in its image plane with an opaque plate having an arcuate aperture slit concentric with the vertical optic axis and angularly displaced an amount where the ratio of change in reflectance to the change of incidence angle for a light reflected from a smooth surface is a maximum.

1 Claim, 3 Drawing Figures

INVENTOR.
FORDYCE E. TUTTLE, deceased
BY
ELEANOR PORTER TUTTLE, executrix
ATTORNEY

APPARATUS FOR DETECTING CHANGES IN A NATURAL OCEAN WAVE PATTERN

This is a continuation of application Ser. No. 54,293, filed July 13, 1970 and now abandoned.

BACKGROUND OF THE INVENTION

This invention relates generally to an apparatus and method for the detection of underwater vehicular movement, by detecting and distinguishing deviations from a normal surface wave condition caused by interaction and interference with the bow and stern waves artificially generated by a vehicle moving underwater.

Detection of underwater vehicles, such as submarines, has proven to be a most challenging problem in recent years. A variety of approaches to the problem have been tried. It is noted that a vehicle moving on and below the surface of water leaves a wake that is generated by the interaction of the moving vehicle structure and the medium itself. Meteorological conditions above and at the ocean's surface provide a given characteristic surface wave pattern over a large area of the ocean at a time. A vehicle moving underwater generates a wave pattern which is transmitted around the moving vehicle and upon reaching the surface boundary of the medium interferes in a destructive manner with a given surface wave condition, producing a smoothing effect, unless the surface conditions are completely calm, unusual for most parts of the ocean today. Thus in a given overall ocean area, a surface deviation could be noted if one had efficient, accurate means to detect this interference between the natural wave pattern and an artificially interferring wave pattern. Applicant provides an apparatus and method for accomplishing this, thereby allowing one to detect the presence or recent passage of a moving underwater (or surface) vehicle from its wake.

BRIEF DESCRIPTION OF THE INVENTION

An apparatus and method for distinguishing wave pattern anomalies in an ocean's surface comprising a camera which is mounted on an observing platform such as an aircraft and having its optic axis vertically disposed and an arcuate aperture slit positioned in the focal plane concentric to the vertical optic axis and offset a sufficient angular distance from said optic axis to receive only those light rays reflecting from a plane surface that exhibit the maximum ratio of reflectance change to angle of incidence change. It can be shown that at approximately a 60° offset angle (being just beyond Brewster's angle, approximately 53°) maximum ratio of reflectance change to the angle of incidence change occurs. The camera film is image motion compensated to compensate for the relative motion between the observing platform and the surface of the earth being photographed. Thus when employing applicant's camera for observing and photographing a given segment of the ocean, sharp patterns will be produced and observable on the film by distinct photographic exposure changes in areas where a disturbing effect has occurred from an interaction between the normal surface wave conditions and an artificially generated vehicular wave pattern. Such disturbing effects have been recognized in photographs taken 30 minutes after the passage of a submarine at a keel depth of 150 feet.

It is an object of this invention to provide an apparatus and method for detecting the actual or recent presence of an underwater or surface moving vehicle.

It is another object of this invention to provide a device capable of noting changes in surface conditions of the ocean that are artificially induced.

It is still another object of this invention to provide a device that is highly sensitive to changes in the reflectance illumination of a surface for particular angles of incidence.

In accordance with these and other objects which will be apparent hereinafter, the instant invention will now be described with particular reference to the accompanying drawings.

PREFERRED EMBODIMENT OF THE INVENTION

Figure 1:
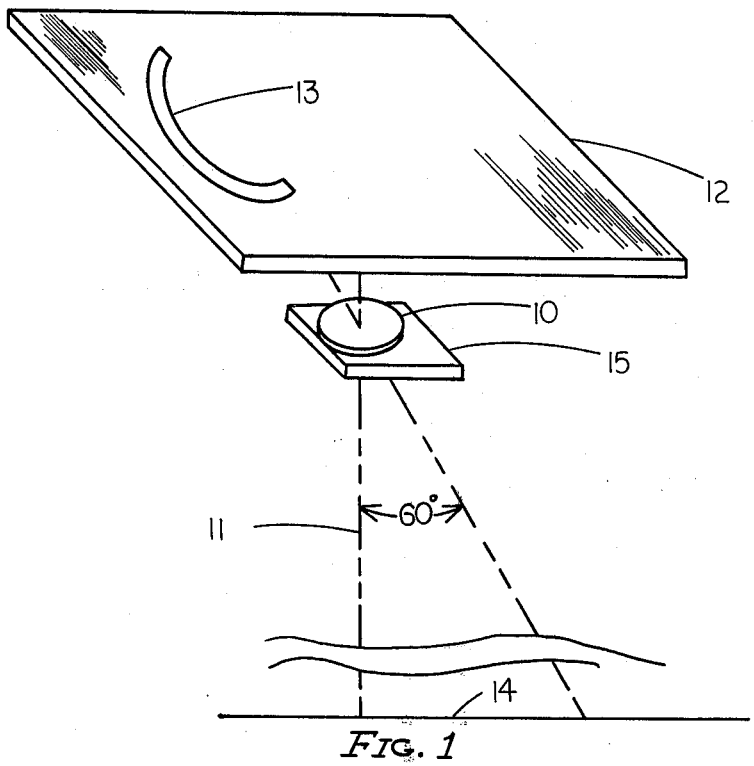
FIG. 1 is a schematic diagram showing the basic operation of the applicant's camera.
Figure 2:
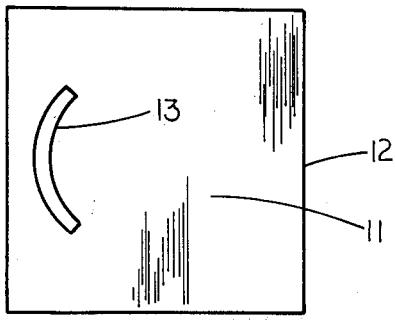
FIG. 2 shows the desired aperture plate.
Figure 3:
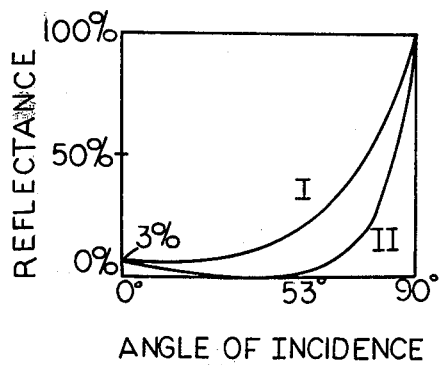
FIG. 3 shows a graph showing reflectance against the angle of incidence of parallel and perpendicular components of a light ray.

Referring now to FIG. 1, a schematic diagram shows one preferred embodiment of applicant's invention. A camera, in FIG. 1, is represented by an optical lens 10 mountable on an observation vehicle (not shown) so that its optic axis 11 is vertically oriented, i.e., perpendicular to the earth's surface. Positioned in the focal plane of lens 10 is an opaque plate 12 having an arcuate aperture slot 13 which is concentric about the optic axis 11 and behind which a photographic film (not shown) is moved in a manner to compensate for movement of the image as the camera moves over the ocean's surface 14. This image motion compensation is known as IMC. The arcuate slot 13 is more clearly shown in the plan view of opaque plate 12 in FIG. 2. In one preferred embodiment, the arcuate slot 13 would be ½° in width and displaced from the graphic axis about 60°. In FIG. 3, the parallel and perpendicular components of sunlight as reflected by the ocean's surface 14 are plotted against the angle of incidence. At normal incidence where $I=90°$, the two components are equally reflected. At the Brewster angle (about 53°), the reflectances of the parallel and perpendicular components are about 0 and 15 percent respectively, and of course, polarized. For this reason, a polarizing filter 15 may be placed on the optical system and oriented to absorbed the polarized reflections of the perpendicular component.

In operation, a submerged object moving through a rough sea leaves behind a more flat surface area than the surrounding sea, meaning that the statistical distribution of the tilts and slants in the surface has been altered. In calm water, the smoothing effect of the hump may no be as apparent as the side wake, i.e., the interference of the bow and stern wakes of a submerged moving object. With the arcuate slot displaced 60° from the optic axis and image motion compensation, the camera will display differences between natural movements and man-made movements of the sea's surface of incidence and reflective sunlight most accurately because the ratio of change of reflectance over the change in incidence is large (as shown in FIG. 3) above a 60° angle of incidence.

The camera employed may be a standard air reconnaissance IMC camera modified to provide in its image plane the particular arcuate slot concentric with and offset from its vertical optic axis from an angle greater than the Brewster angle.

Although the device has been shown for use in detection of submerged moving objects through the sea, it is noted that it can also be used for the detection of wakes of surface vesssels also.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A device for detecting the presence of a moving underwater vehicle which discerns differences in the natural occurring ocean surface wave pattern comprising:

an image forming means mounted for receiving reflected electro-magnetic radiation from the surface of said ocean;

arcuate aperture means in the focal plane of said image forming means, said arcuate aperture being spaced from the optical axis of said image forming means such that a ray having the angle of incidence to the mean ocean surface of greater than 57° will pass through the aperture; and means for detecting the intensity level of said received reflected radiation.

* * * * *